Patented Apr. 21, 1936

2,037,718

UNITED STATES PATENT OFFICE 2,037,718

XANTHATES AND METHOD OF MAKING SAME

George De Witt Graves, Wilmington, Del., assignor to E. I. du Pont de Nemours & Company, Wilmington, Del., a corporation of Delaware No Drawing. Application November 9, 1932, Serial No. 641,874

16 Claims. (Cl. 260—99.11)

This invention relates to the preparation of xanthates, and more particularly pertains to the preparation of xanthates of the higher primary aliphatic monohydric alcohols.

An object of the invention relates to the preparation of xanthates of primary aliphatic monohydric alcohols containing from six to fifteen carbon atoms.

The xanthates comprising the subject matter of the present invention are prepared according to the reaction:

$$R\text{—}OH + CS_2 + MOH \longrightarrow R\text{—}O\text{—}\underset{\underset{S}{\|}}{C}\text{—}S\text{—}M + H_2O$$

wherein R represents an aliphatic radical and M represents a metal preferably of the alkali metal group.

Alcohols from which the novel xanthates are prepared may be saturated or unsaturated. Such unsaturated alcohols may contain one or more unsaturated bonds, and the unsaturated bonds may be double or triple bonds. The hydrocarbon residue to which the hydroxyl group is attached may be either normal or branched.

Saturated primary alcohols from which the novel xanthates may be derived or listed as follows:

Hexyl alcohol—$C_6H_{13}OH$
Heptyl alcohol—$C_7H_{15}OH$
Octyl alcohol—$C_8H_{17}OH$
Nonyl alcohol—$C_9H_{19}OH$
Decyl alcohol—$C_{10}H_{21}OH$
Undecyl alcohol—$C_{11}H_{23}OH$
Dodecyl alcohol—$C_{12}H_{25}OH$
Tridecyl alcohol—$C_{13}H_{27}OH$
Tetradecyl alcohol—$C_{14}H_{29}OH$
Pentadecyl alcohol—$C_{15}H_{31}OH$ Saturated forked carbon chain alcohols from which the novel xanthates may be derived are as follows:

2,4-dimethylpentanol-1
  $(CH_3)_2CH\text{—}CH_2\text{—}CH(CH_3)\text{—}CH_2OH$
4-methylhexanol-1
  $CH_3CH_2\text{—}CH(CH_3)\text{—}CH_2\text{—}CH_2\text{—}CH_2OH$
2,4-dimethylhexanol-1
  $CH_3\text{—}CH_2CH(CH_3)\text{—}CH_2\text{—}CH(CH_3)\text{—}CH_2OH$
5-methylheptanol-1
  $CH_3\text{—}CH_2CH(CH_3)CH_2\text{—}CH_2\text{—}CH_2\text{—}CH_2OH$
4,6-dimethylheptanol-1
  $CH_3\text{—}CH(CH_3)\text{—}CH_2\text{—}CH(CH_3)\text{—}$
              $CH_2\text{—}CH_2\text{—}CH_2OH$
2,6-dimethyloctanol-1
  $CH_3\text{—}CH_2\text{—}CH(CH_3)\text{—}CH_2\text{—}CH_2\text{—}$
              $CH_2\text{—}CH(CH_3)\text{—}CH_2OH$
2,4,6-trimethyloctanol-1
  $CH_3\text{—}CH_2\text{—}CH(CH_3)\text{—}CH_2\text{—}CH(CH_3)\text{—}$
              $CH_2\text{—}CH(CH_3)\text{—}CH_2OH$
2-ethyl-4,6-dimethyloctanol-1
  $CH_3\text{—}CH_2\text{—}CH(CH_3)\text{—}CH_2\text{—}CH(CH_3)\text{—}$
              $CH_2\text{—}CH(C_2H_5)\text{—}CH_2OH$
2,4,6-trimethyldecanol-1
  $CH_3\text{—}CH_2\text{—}CH_2\text{—}CH_2\text{—}CH(CH_3)\text{—}CH_2\text{—}$
              $CH(CH_3)\text{—}CH_2\text{—}CH(CH_3)\text{—}CH_2OH$
2,4,6,8-tetramethyldecanol-1
  $CH_3\text{—}CH_2\text{—}CH(CH_3)\text{—}CH_2\text{—}CH(CH_3)\text{—}$
              $CH_2\text{—}CH(CH_3)\text{—}CH_2\text{—}CH(CH_3)\text{—}CH_2OH$ These forked carbon chain primary alcohols may be obtained by the catalytic hydrogenation of carbon monoxide.

Illustrations of unsaturated primary alcohols which may be xanthated to produce novel xanthates are given in the following list:

Hexen (1) ol (6)—$C_6H_{11}OH$
Hepten (1) ol (7)—$C_7H_{13}OH$
Octen (1) ol (8)—$C_8H_{15}OH$
Nonen (1) ol (9)—$C_9H_{17}OH$
Citronellol—$C_{10}H_{19}OH$
Geraniol—$C_{10}H_{17}OH$
Undecylen (1) ol (11)—$C_{11}H_{21}OH$
Dodecylen (1) ol (12)—$C_{12}H_{23}OH$
Isododecylen (2) ol (11)—$C_{12}H_{23}OH$
Tridecylen (1) ol (13)—$C_{13}H_{25}OH$
Isotridecylen (2) ol (12)—$C_{13}H_{25}OH$
Tetradecylen (1) ol (14)—$C_{14}H_{27}OH$
Isotetradecylen (2) ol (13)—$C_{14}H_{27}OH$
Pentadecylen (1) ol (15)—$C_{15}H_{29}OH$
Isopentadecylen (2) ol (14)—$C_{15}H_{29}OH$ The following examples illustrate the preparation of typical members of the novel xanthate series:

*Example 1—Dodecyl potassium xanthate*

A mixture of 6.2 grams of finely powdered potassium hydroxide, 22.5 grams of dodecyl alcohol and 13.5 grams of carbon bisulfide were stirred thoroughly together and allowed to stand at room temperature with occasional stirring for 12 hours. The product which was a yellow solid was recrystallized from alcohol to give light yellow crystals of dodecyl potassium xanthate which analyzed 20.1% sulfur compared to a calculated value of 21.3.

*Example 2—Hexyl potassium xanthate*

0.5 g. KOH, 2 g. normal hexyl alcohol, 2 cc. $CS_2$ were stirred together and allowed to stand at room temperature. The yellow solid xanthate formed almost at once.

Example 3—Octyl potassium xanthate

Fifty g. KOH, 200 g. normal octyl alcohol, 200 cc. $CS_2$ were stirred together and allowed to stand at room temperature. The yellow solid xanthate formed almost at once.

From the above examples it is evident that a mixture of an alcohol, carbon bisulfide, and a caustic alkali, will react at room temperature to yield the xanthate salt corresponding to the alcohol used. The proportions of the reacting ingredients may be varied between wide limits. The temperature may likewise be varied to a certain extent above and below room temperature. The alkali while preferably in a non-aqueous state, may be either dissolved or dispersed through an aqueous medium. The alkali used may be either potassium hydroxide, or sodium hydroxide, the xanthate produced being respectively the potassium or the sodium salt.

Single xanthates may be prepared by reacting a single primary alcohol together with carbon bisulfide and caustic alkali. However, a mixture of several of the novel xanthates may be prepared by reacting a mixture of primary alcohols, whether saturated or unsaturated, with carbon bisulfide and alkali, the individual xanthates being separated from the reacted mixture in any suitable way.

Xanthates of mixtures of higher forked carbon chain alcohols, such as are obtained in the catalytic hydrogenation of carbon monoxide, may also be prepared.

The novel xanthates prepared according to the teachings of the present invention have a variety of uses being particularly adaptable for use as rubber accelerators and as flotation agents.

These xanthates are particularly useful as penetrating or "wetting out" agents in the mercerizing, impregnating or otherwise treating fibrous material such as spun, woven, or unwoven natural or synthetic textile fibers or fabrics, paper, leather, felt, and the like, being much more effective for this purpose than are the xanthates of lower alcohols. This is particularly true since alcohols of this class are, in general, of relatively low melting point, i. e., melt below approximately 40° C. They have a correspondingly more effective solubility and penetrating power. They are also effective as insecticides and particularly those containing about twelve carbon atoms in the molecule, e. g., dodecyl xanthate.

The invention is not intended to be limited to the specific description and examples given above. Any variation or modification therefrom which conforms to the spirit of the invention is intended to be included within the scope of the claims.

I claim:

1. A substantially pure xanthate of an aliphatic primary monohydric alcohol containing from six to fifteen carbon atoms.
2. A substantially pure xanthate of a normal aliphatic primary monohydric alcohol containing from six to fifteen carbon atoms.
3. A substantially pure xanthate of an aliphatic saturated primary monohydric alcohol containing from six to fifteen carbon atoms.
4. A substantially pure xanthate of an aliphatic unsaturated primary monohydric alcohol containing from six to fifteen carbon atoms.
5. A substantially pure xanthate of a normal aliphatic saturated primary monohydric alcohol containing from six to fifteen carbon atoms.
6. A substantially pure compound having the following structural formula:

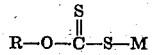

wherein R represents a primary aliphatic hydrocarbon radical containing from six to fifteen carbon atoms, and M represents an alkali metal.

7. A process for preparing xanthates which comprises commingling a caustic alkali, carbon bisulfide and a substantially pure primary aliphatic monohydric alcohol containing from six to fifteen carbon atoms, effecting a reaction between the ingredients of the mixture for a period of time sufficient to form a xanthate, and separating the formed xanthate from the reacted mixture.

8. Substantially pure octyl-1 xanthate.
9. An xanthate of an n-aliphatic saturated primary alcohol taken from the group consisting of dodecyl and tetradecyl.
10. Dodecyl xanthate.
11. The compound described in claim 6 characterized in that the radical is n-octyl.
12. The compound described in claim 6 in which the radical is taken from the group consisting of dodecyl and tetradecyl.
13. The compound described in claim 6 characterized in that the radical is dodecyl.
14. A substantially pure xanthate of an aliphatic unsaturated primary monohydric alcohol containing from six to eight carbon atoms.
15. A substantially pure alkali metal xanthate of an aliphatic unsaturated primary monohydric alcohol containing from six to eight carbon atoms.
16. A compound having the following structural formula:

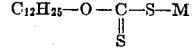

wherein M represents an alkali metal.

GEORGE D. GRAVES.